Oct. 30, 1923.
J. KENDZIERSKI
WASTE TRAP
Filed Aug. 11, 1921
1,472,476
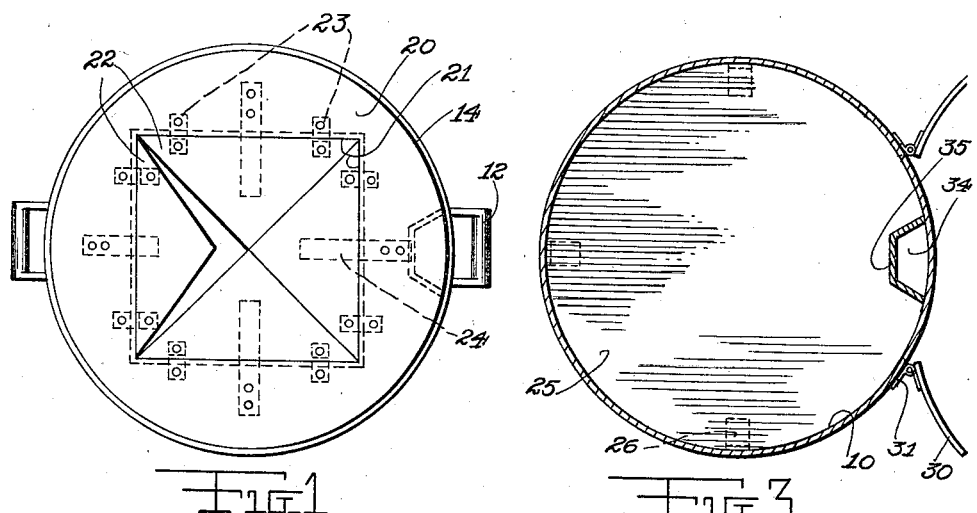
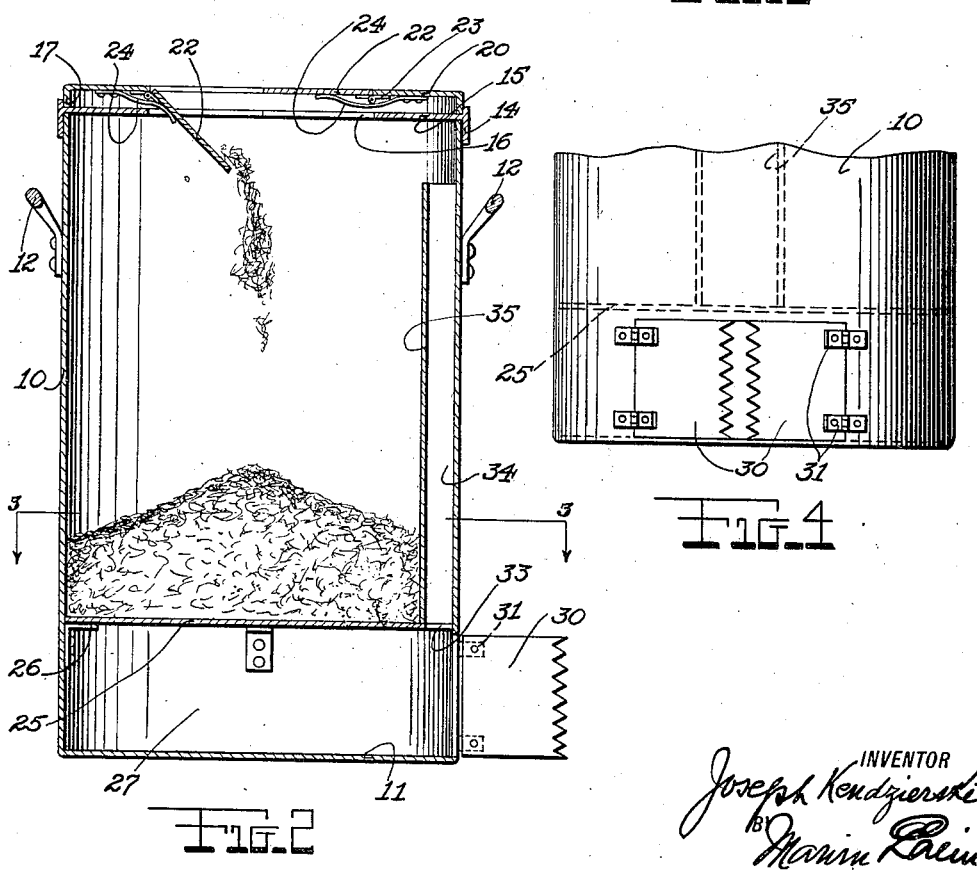
INVENTOR
Joseph Kendzierski
BY
ATTORNEY Patented Oct. 30, 1923.

1,472,476

UNITED STATES PATENT OFFICE.

JOSEPH KENDZIERSKI, OF MINNEAPOLIS, MINNESOTA.

WASTE TRAP.

Application filed August 11, 1921. Serial No. 491,355.

*To all whom it may concern:*

Be it known that I, JOSEPH KENDZIERSKI, a citizen of Poland, residing at Minneapolis, in the county of Hennepin and State of Minnesota, have invented certain new and useful Improvements in Waste Traps, of which the following is a specification.

This invention has for one of its objects the provision of a novel type of trap, in the form of a can particularly adapted to receive food débris and waste, such as occur in domestic establishments, and contain the same until a convenient time for disposal.

Another purpose is to produce a device in which such waste matter can be easily dumped, no cover having to be removed in order to accomplish the entrance of the material.

A further object is to provide means combined with the can for entrapping rats and mice, which attracted by the odor of the garbage, congregate in its vicinity, rendering it unsanitary due to such conditions.

These and other like objects are attained by the novel construction, combination and arrangement of parts, hereinafter described and shown in the accompanying drawings, forming a material part of this disclosure and in which:—

Figure 1 is a top plan view showing a trap made in accordance with the invention, one of its several covers being depressed as in operation.

Figure 2 is a vertical sectional view taken on the center line of the same.

Figure 3 is a transverse sectional view taken in a plane indicated by the line 3—3 of Figure 2.

Figure 4 is a fragmentary side elevational view of the trap showing the base doors ajar.

Referring to the drawings in detail, the numeral 10 designates the straight cylindrical wall of the can, the same having a bottom 11 and being provided with a pair of opposed handles 12, for convenience in handling.

A band 14 surrounds the can at its top, stiffening and re-enforcing the edge, and carried by the band is a circular plate 15, having an opening 16, the plate constituting an inner cover.

The upper portion of the band receives within it an annular flange 17 formed with the outer or top cover plate 20, this plate having a square opening 21 to the edges of which are hingedly engaged the bases of triangular lids 22, fitted so that when level as to form a tight closure for the opening, the hinges 23 being secured on the lower side of the plate.

In order to hold the lids normally level, flat springs 24 are secured below the plate 20, their free inner ends acting as supports on which the lids rest.

Thus in entering matter into the can, one or more of the lids will be momentarily depressed, as shown in Figures 2 and 3, the refuse continuing downward through the opening 16, which limits the action of the lids, and it is to be understood that the band and covers carried by it can be removed or replaced as a unit.

At a point above the bottom 11 there is secured a transverse partition plate 25, resting on internal brackets 26 fixed to the wall of the cylinder and presenting a chamber 27 in the base of the structure.

This chamber is accessible by means of doors 30, connected by hinges 31 to the outer edges of the wall of the cylinder and normally covering a passage therethrough.

The doors when partly open prevent the entrance of domestic animals but permit the entrance of small animals, which, attracted by the smell, pass through an opening 33 in the flooring 25, and thence upward through a space 34, formed between the wall of the cylinder and a plate 35, bent to present longitudinal angles, enclosing the passage, which terminates below the band, leading into the interior of the can as shown.

Thus the garbage acts as a bait or lure to entice rats and mice to enter the can and the tubular passage through which they entered then prevents their escape.

Having thus described my invention, what I claim as new and desire to secure by Letters Patent, is:—

A container made in the form of a cylindrical can having a compartment in its base, a chamber thereabove, a walled passage leading unobstructedly from said compartment to the upper part of said chamber, said passage having opposed walls spaced relatively closely together, and a cover over the chamber.

In witness whereof I affix my signature.

JOSEPH KENDZIERSKI.